(12) United States Patent
Kakuta et al.

(10) Patent No.: US 8,082,164 B2
(45) Date of Patent: Dec. 20, 2011

(54) RESERVATION ACCEPTANCE SYSTEM AND COMPUTER PROGRAM PRODUCT

(75) Inventors: Jun Kakuta, Kawasaki (JP); Masahiko Murakami, Kawasaki (JP); Takashi Ohno, Kawasaki (JP); Shingo Fujimoto, Kawasaki (JP); Akinori Iwakawa, Kawasaki (JP); Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1035 days.

(21) Appl. No.: 10/763,181

(22) Filed: Jan. 26, 2004

(65) Prior Publication Data

US 2004/0181439 A1 Sep. 16, 2004

(30) Foreign Application Priority Data

Mar. 11, 2003 (JP) ................................. 2003-064479

(51) Int. Cl.
*G06Q 99/00* (2006.01)
(52) U.S. Cl. ................................. 705/5; 705/6
(58) Field of Classification Search .................. 705/5, 6
See application file for complete search history.

(56) References Cited

U.S. PATENT DOCUMENTS

| 2002/0062236 A1* | 5/2002 | Murashita et al. | 705/5 |
| 2003/0065805 A1* | 4/2003 | Barnes, Jr. | 709/231 |

FOREIGN PATENT DOCUMENTS

| JP | 6-19929 | 1/1994 |
| JP | 2869583 | 1/1999 |
| JP | 2001-84418 | 3/2001 |
| JP | 2001-92877 | 4/2001 |
| JP | 2001-331590 | 11/2001 |
| JP | 2002-7826 | 1/2002 |
| JP | 2002-41897 | 2/2002 |
| JP | 2002-236732 | 8/2002 |
| JP | 2002-236832 | 8/2002 |
| JP | 2002-279260 | 9/2002 |
| JP | 2003-20120 | 1/2003 |

OTHER PUBLICATIONS

Japanese Office Action issued in priority Japanese Application 2003-064479 dated Jan. 24, 2006.

"Tabi no madoguchi: a general travel reservation system", My Trip Net Co., Ltd., Feb. 20, 2003, [searched on Feb. 20, 2003], the Internet http://www.mytrip.net/.

(Continued)

*Primary Examiner* — Akiba Robinson Boyce
(74) *Attorney, Agent, or Firm* — Staas & Halsey LLP

(57) ABSTRACT

A reservation acceptance system is provided that accepts requests of reservations from customers so that the resources can be used efficiently. The reservation acceptance system includes a reservation request reception portion for accepting a request for providing a service, a position information reception portion for obtaining position information of a customer who made the request, an acceptance condition database for storing area condition information defining a predetermined area around a provision position of the service, an existence decision portion for deciding whether or not the customer is within the predetermined area in accordance with the position information and the area condition information, and a reservation acceptance processing portion that performs a reservation acceptance process of the service when it is decided that the customer is within the predetermined area and does not perform the reservation acceptance process when it is decided that the customer is not within the predetermined area.

8 Claims, 18 Drawing Sheets

OTHER PUBLICATIONS

"Parking Information", PARK 24 Co., Ltd., May 30, 2002, [searched on Feb. 20, 2003], the Internet http://www.times-info.net/pc/reserv/index.html.

"About implementation of a pin point information delivery trial service 'Jaran Navi Sapporo' for cellular phones utilizing high precision positional information", KDDI Corporation, Recruit Co., Ltd., NEC Corporation, Apr. 17, 2002, [searched on Feb. 20, 2003], the Internet http://www.kddi.com/release/2002/0417-1/.

Japanese Patent Office Action, mailed Dec. 19, 2006, and issued in priority Japanese Patent Application No. 2003-064479.

* cited by examiner

VICS OR THE LIKE

PARKING LOT A

| USER ID | NAME | LICENCE PLATE | CAR TYPE | ELECTRONIC MAIL ADDRESS | ... |
|---|---|---|---|---|---|
| 0001 | AAA | KOBE 55 A xx-xx | X COMPANY XXX | taro@xxx.yy.com | |
| 0002 | BBB | KYOTO 33 B xx-xx | Y COMPANY YYY | jiro@aaaaa.bb.co.jp | |
| 0003 | CCC | SHINAGAWA 34 C xx-xx | Z COMPANY ZZZ | hanako@mail.xxxxx.ne.jp | |
| 0004 | DDD | NARA 56 D xx-xx | X COMPANY XXX | ichiro@abcde.zzzzz.com | |
| 0005 | EEE | SHIGA 33 E xx-xx | Y COMPANY YYY | aiko@aaaaa.bbbbb.com | |
| ... | ... | ... | ... | ... | |

| CONDITION NUMBER | AREA (CONDITION) |
|---|---|
| 1 | (x1,y1),(x2,y2),(x3,y3),(x4,y4) |
| 2 | (x5,y5),(x6,y6),(x7,y7),(x8,y8),(x9,y9),(x10,y10),(x11,y11) |
| 3 | SUEHIRO CHO 3-CHOME,SUEHIRO CHO 4-CHOME, SHOWA CHO 1-CHOME |

| CONDITION NUMBER | DISTANCE (CONDITION) |
|---|---|
| 1 | LESS THAN 10KM |
| 2 | LESS THAN 12KM WHEN BEING ON ROUTE 2 |
| 3 | LESS THAN 15KM WHEN BEING ON ROUTE 43 |

| CONDITION NUMBER | TIME UNTIL ARRIVAL (CONDITION) |
|---|---|
| 1 | LESS THAN 10 MINUTES |
| 2 | LESS THAN 8 MINUTES WHEN BEING ON ROUTE 2 |
| 3 | LESS THAN 6 MINUTES WHEN BEING ON ROUTE 43 |

| PARKING SPACE No. | STATE | AVAILABLE CAR TYPE | ... |
|---|---|---|---|
| 101 | VACANT | BIG CAR | |
| 102 | PARKED | LIGHT CAR | |
| 103 | VACANT | MEDIUM SIZE OR LIGHTER CAR | |
| ⋮ | ⋮ | ⋮ | |

FIG.9

PARKING LOT RESERVATION
FORM

USER ID: TX

PASSWORD: TX

TIME FOR USE: TX

TRANSMISSION     CANCEL
BN1            BN2

| RESERVATION ACCEPTANCE ID | USER ID | LICENCE PLATE | RESERVATION ACCEPTANCE TIME | TIME FOR USE | EXPIRATION TIME |
|---|---|---|---|---|---|
| Y0001 | 0001 | KOBE 55 A xx-xx | 09:13 | 2 HOURS | 09:53 |
| Y0002 | 0002 | KYOTO 33 B xx-xx | 10:05 | 8 HOURS | 11:15 |
| Y0003 | 0003 | SHINAGAWA 34 C xx-xx | 10:45 | 3 HOURS | 11:25 |
| Y0004 | 0004 | NARA 56 D xx-xx | 11:48 | 1 HOURS | 12:18 |
| Y0005 | 0005 | SHIGA 33 E xx-xx | 12:10 | 4 HOURS | 13:00 |
| ... | ... | ... | ... | ... | ... |

| LEVEL | RATIO OF VACANCY (PARAMETER) | DISTANCE |
|---|---|---|
| 1 | UNDER 5% | LESS THAN 3KM |
| 2 | OVER 5% AND UNDER 10% | LESS THAN 5KM |
| 3 | OVER 10% AND UNDER 15% | LESS THAN 10KM |
| 4 | OVER 15% AND UNDER 20% | LESS THAN 15KM |
| 5 | OVER 20% | LESS THAN 25KM |

FIG.13B
TL8b

| LEVEL | TIME FOR USE (PARAMETER) | DISTANCE |
|---|---|---|
| 1 | UNDER 30 MINUTES | LESS THAN 3KM |
| 2 | OVER 31 MINUTES AND UNDER 60 MINUTES | LESS THAN 5KM |
| 3 | OVER 61 MINUTES AND UNDER 120 MINUTES | LESS THAN 10KM |
| 4 | OVER 121 MINUTES AND UNDER 240 MINUTES | LESS THAN 15KM |
| 5 | OVER 241 MINUTES | LESS THAN 25KM |

FIG.13C
TL8c

| LEVEL | FORECASTED DEMAND (PARAMETER) | DISTANCE |
|---|---|---|
| 1 | OVER 100 CARS/HOUR | LESS THAN 3KM |
| 2 | 99-70 CARS/HOUR | LESS THAN 5KM |
| 3 | 69-40 CARS/HOUR | LESS THAN 10KM |
| 4 | 39-20 CARS/HOUR | LESS THAN 15KM |
| 5 | UNDER 19 CARS/HOUR | LESS THAN 25KM |

FIG.13D
TL8d

| LEVEL | DAY OF THE WEEK, TIME ZONE (PARAMETER) | DISTANCE |
|---|---|---|
| 1 | HOLIDAY DAYTIME (9:00-17:00) | LESS THAN 3KM |
| 2 | HOLIDAY NIGHT (17:00-21:00) | LESS THAN 5KM |
| 3 | WEEKDAY DAYTIME (9:00-17:00) | LESS THAN 10KM |
| 4 | WEEKDAY NIGHT (17:00-21:00) | LESS THAN 15KM |
| 5 | MIDNIGHT AND EARLY-MORNING (21:00-9:00) | LESS THAN 25KM |

RESERVATION ACCEPTANCE SYSTEM AND COMPUTER PROGRAM PRODUCT

BACKGROUND OF THE INVENTION

1. Field of the Invention

The present invention relates to a system and a method for processing an acceptance of a reservation that is made by a customer who is in a remote place.

2. Description of the Prior Art

Conventionally, a system is proposed or commercialized that is for processing an acceptance of a reservation that is made by a customer who is in a remote place. For example, Japanese unexamined patent publications No. 6-19929, No. 2001-84418, No. 2002-236832, No. 2002-7826 and No. 2002-279260 and Japanese patent No. 2869583 disclose systems in which a reservation can be made by using a cellular phone by a customer who wants to use a parking lot or a restaurant. In addition, systems in a practical use that accept reservations from customers who are in remote places are disclosed in other documents including "Tabi no madoguchi: a general travel reservation system", MY TRIP NET CO., LTD., Feb. 20, 2003, [searched on Feb. 20, 2003], the Internet <http://www.mytrip.net/>, "Parking Information", PARK 24 Co., Ltd., May 30, 2002, [searched on Feb. 20, 2003], the Internet <http://www.times-info.net/pc/reserv/index.html>, and "About implementation of a pin point information delivery trial service 'Jaran Navi Sapporo' for cellular phones utilizing high precision positional information", KDDI Corporation, RECRUIT CO., LTD., NEC Corporation, Apr. 17, 2002, [searched on Feb. 20, 2003], the Internet <http://www.kddi.com/release/2002/0417-1/>.

According to these systems, a customer who wants to use a parking lot, a restaurant or others can make a reservation of a parking space or a seat in advance so that the customer is not required to wait for a long time when he or she arrives at the place. Also, a manager can calculate demands at an early stage, which can be utilized for an effective management.

However, if all the requests for reservation from customers are accepted uniformly, there is a case where the management efficiency drops and the profit decreases.

Namely, in order to obtain as much profit as possible in the case where a resource (a parking space) is provided to a customer in a minute increments like a parking lot or in the case where a piece rate of sales is low for example, it is necessary to increase a turnover or an availability factor of the parking space. However, if the request for reservation from a customer who is in a distant place is accepted without any limitations, the parking space that will be kept for the customer cannot be used until the customer arrives at the parking lot. In addition, it is possible that the customer will arrive lately due to an unexpected traffic jam. As a result, the turnover or the availability factor of the resource may be dropped, and the management efficiency may be lowered.

It is considered to rent the parking space that is kept for the customer to another customer until the former customer arrives at the parking lot. In that case, however, if the car of the latter customer does not go out of the parking space before the car of the former customer who made the reservation arrives at the parking lot, the former customer who made the reservation cannot use the parking space.

Furthermore, as described in Japanese unexamined patent publication No. 2002-236832, a method can be considered in which a reservation is accepted by a so-called semantic information network. In that case, however, the current system for providing a service has to be reconstructed so as to be adapted to the semantic information network. Such a reconstruction is a large scale and difficult. In addition, even if the semantic information network can be constructed for providing a service, there will be still a problem that a cost of administration is high. Accordingly, the use of the semantic information network is not realistic for a person who provides a service for a low unit price of sales.

SUMMARY OF THE INVENTION

An object of the present invention is to provide a system that accepts a reservation from a customer so that a resource can be used efficiently for a manager of the resource.

A reservation acceptance system according to the present invention includes a request acceptance portion for accepting a request for providing a service, a current position information obtaining portion for obtaining current position information that indicates a current position of a customer who made the request, an area information storage portion for storing area information that defines a predetermined area around a provision position of the service, an existence decision portion for deciding whether or not the customer who made the request is within the predetermined area in accordance with the current position information and the area information, and a reservation acceptance processing portion that performs a reservation acceptance process for accepting a reservation of the service that relates to the request when it is decided that the customer who made the request is within the predetermined area and does not perform the reservation acceptance process when it is decided that the customer is not within the predetermined area.

In a preferred embodiment, the system further includes a provided quantity information obtaining portion for obtaining provided quantity information concerning a quantity of the service that can be provided. The area information has a parameter that indicates the quantity so that the predetermined area is defined as a larger area as the quantity indicated by the parameter is larger. The existence decision portion performs the decision by deciding whether or not the customer who made the request is within an area that is defined in accordance with the quantity indicated by the provided quantity information and the area information.

If the service is to provide a parking space in a parking lot, the reservation acceptance system can be structured as below. Namely, the system includes a traffic information obtaining portion for obtaining traffic information around the parking lot or the customer who made the request, the traffic information being transmitted from an information providing portion, and a demand forecast portion for forecasting a future demand of the parking lot in accordance with the obtained traffic information. The area information has a parameter that indicates a quantity of the demand so that the predetermined area is defined as a larger area as the quantity indicated by the parameter is smaller. The existence decision portion performs the decision by deciding whether or not the customer who made the request is within an area that is defined in accordance with the forecasted demand and the area information.

Furthermore, the service in the present invention means to provide a physical resource (such as a parking space, a room, an OA machine, a seat in a restaurant or a commodity product) or a human resource (such as a cook, a counselor or a cosmetologist), for example, to rent a parking space in a parking lot, to rent a room in a hotel, to rent a room in a Karaoke shop, to rent an OA machine installed in a rental office, to provide a meal in a restaurant, to sell a limited

BRIEF DESCRIPTION OF THE DRAWINGS

FIG. 4 is a table showing an example of a customer table.

FIG. 5 is a table showing an example of area condition information.

FIG. 6 is a table showing an example of distance condition information.

FIG. 7 is a table showing an example of time condition information.

FIG. 8 is a diagram showing an example of a parking space table.

FIG. 9 is a diagram showing an example of a reservation screen.

FIG. 10 is a table showing an example of a reservation table.

FIGS. 13A-13D are tables showing an example of change information tables.

DESCRIPTION OF THE PREFERRED EMBODIMENTS

Hereinafter, the present invention will be explained more in detail with reference to embodiments and drawings.

First Embodiment

Figure 1:
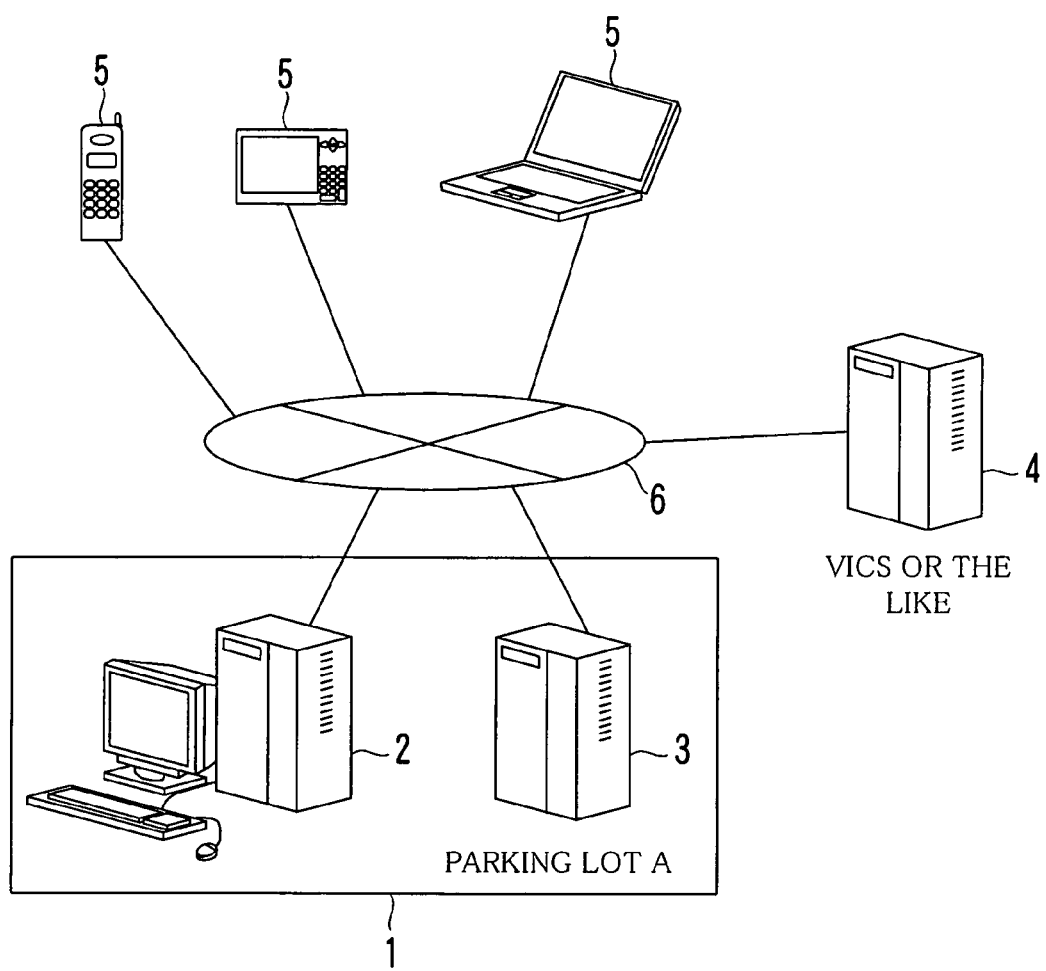
FIG. 1 is a diagram showing a general structure of a system including a reservation acceptance system according to the present invention.
Figure 2:
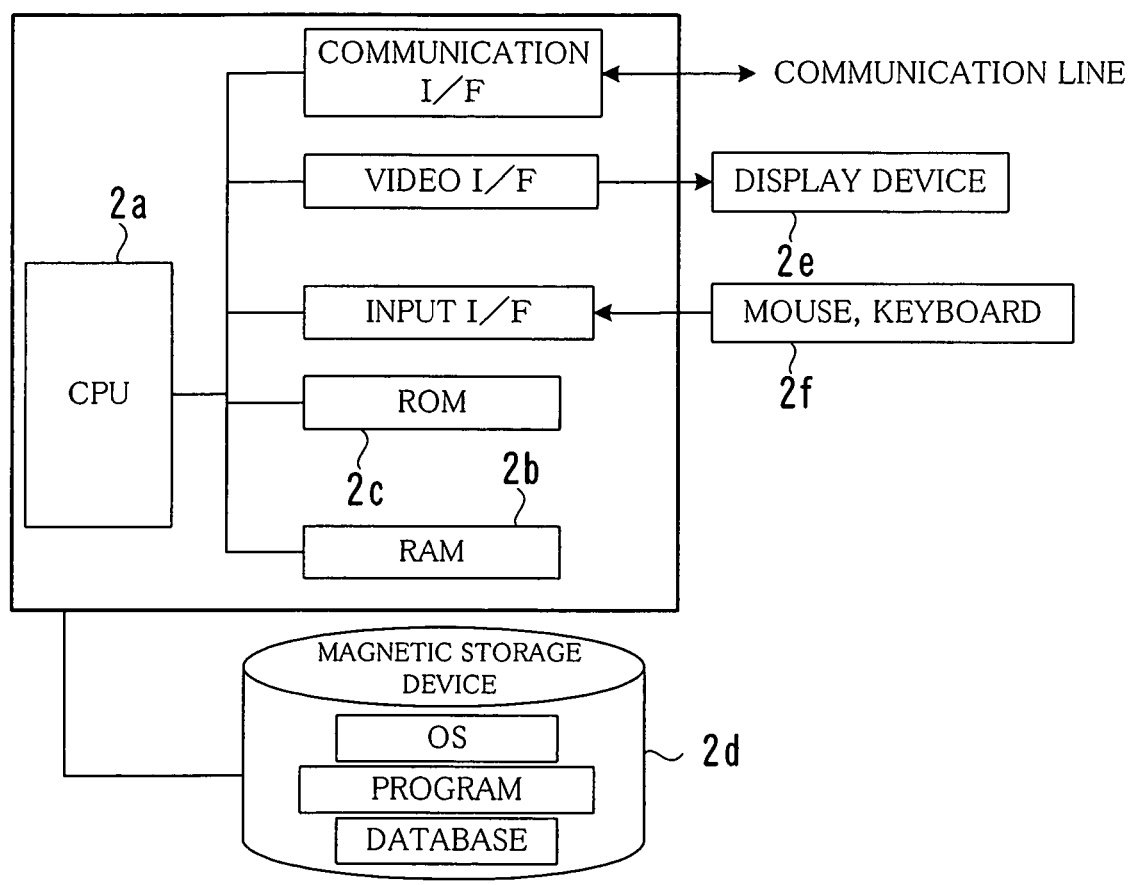
FIG. 2 is a diagram showing an example of a hardware structure of the reservation acceptance system.
Figure 3:
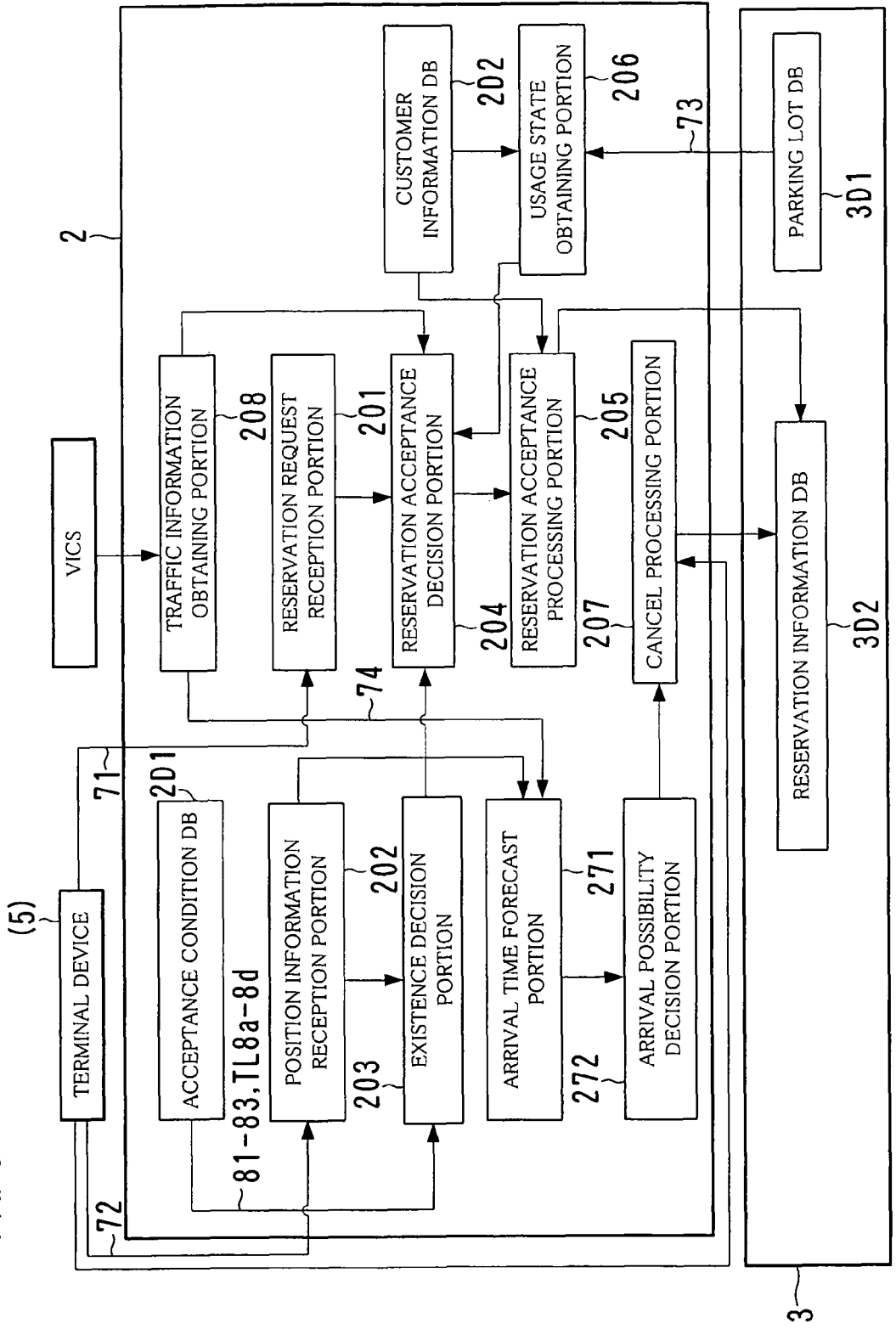
FIG. 3 is a diagram showing an example of a functional structure of the reservation acceptance system and a parking lot usage management system.

FIG. 1 is a diagram showing a general structure of a system including a reservation acceptance system 2 according to the present invention. FIG. 2 is a diagram showing an example of a hardware structure of the reservation acceptance system 2. FIG. 3 is a diagram showing an example of a functional structure of the reservation acceptance system 2 and a parking lot usage management system 3. FIG. 4 is a table showing an example of a customer table TL1. FIG. 5 is a table showing an example of area condition information 81. FIG. 6 is a table showing an example of distance condition information 82. FIG. 7 is a table showing an example of time condition information 83. FIG. 8 is a diagram showing an example of a parking space table TL2. FIG. 9 is a diagram showing an example of a reservation screen HG1. FIG. 10 is a table showing an example of a reservation table TL3.

As shown in FIG. 1, the reservation system 1 includes the reservation acceptance system 2 according to the present invention and the parking lot usage management system 3. The reservation acceptance system 2 and the parking lot usage management system 3 can be connected with each other via a network 6. As the network 6, the Internet, an intranet, a private line and/or a public network can be used.

An information providing system 4 is a system that is managed by a road traffic control center or others and provides information relating to road traffic by wireless and/or wire. Examples of the information providing system 4 include VICS (Vehicle Information and Communication System) in Japan.

The parking lot usage management system 3 performs a process for managing parking spaces in a parking lot A. The reservation acceptance system 2 performs a process for accepting a reservation of a parking space for a car driver who wants to use this parking lot A. Namely, the reservation acceptance system 2 goes between the driver and the parking lot A.

The driver can make a reservation by operating a terminal device 5 at his or her hand from a remote place. As the terminal device 5, a device that can transmit position information is used. For example, a cellular phone that has a GPS (Global Positioning System) function, a PHS (Personal Handyphone System) as a kind of a cellular phone, a PDA (Personal Digital Assistant) that has a GPS function, a mobile personal computer that has a GPS function or a terminal device for a car navigation system can be used. Furthermore, on the terminal device 5, during the period until the car arrives at the parking lot A, an application program for reservation is operating for entering necessary items for the reservation and for transmitting the position information.

The reservation acceptance system 2 includes a CPU 2a, a RAM 2b, a ROM 2c, a magnetic storage device 2d, a display device 2e, an input device 2f such as a mouse or a keyboard and various interfaces as shown in FIG. 2.

An operating system (OS), and programs and data for realizing a reservation request reception portion 201, a position information reception portion 202, a existence decision portion 203, a reservation acceptance decision portion 204, a reservation acceptance processing portion 205, a usage state obtaining portion 206, a cancel processing portion 207, an arrival time forecast portion 271, an arrival possibility decision portion 272, a traffic information obtaining portion 208, an acceptance condition database 2D1 and a customer information database 2D2 as shown in FIG. 3 are installed in the magnetic storage device 2d. These programs and data are loaded into the RAM 2b responding to necessity and the program is executed by the CPU 2a.

The parking lot usage management system 3 has the same hardware structure as the reservation acceptance system 2. An operating system (OS), and programs and data for realizing a parking lot database 3D1 and a reservation information database 3D2 as shown in FIG. 3 are installed into a magnetic storage device of the parking lot usage management system 3.

Hereinafter, functions and processes of the portions shown in FIG. 3 will be explained. The customer information database 2D2 stores and manages the customer table TL1 as shown in FIG. 4. This customer table TL1 stores information about customers (users) who use the parking lot A in connection with user IDs that were issued for identifying the users.

Namely, information about user registration is stored. As the user ID, an identifier that is assigned to the terminal device 5 of the customer uniquely (for example, a telephone number of a cellular phone) can be used.

The acceptance condition database 2D1 stores area condition information 81, distance condition information 82 and time condition information 83 as shown in FIGS. 5, 6 and 7, respectively. These pieces of information indicate conditions for deciding whether or not a reservation of a parking space in the parking lot A is acceptable. Hereinafter, these pieces of information indicating conditions for deciding whether or not a reservation is acceptable may be referred to as a general name "condition information 8".

The parking lot database 3D1 stores and manages the parking space table TL2 as shown in FIG. 8. This parking space table TL2 stores information about a vacancy state and a car type that can be parked in the space of each parking space in the parking lot A.

The reservation request reception portion 201 receives reservation request information 71 that indicates a request for reservation for parking a car in the parking lot A from the terminal device 5. Then, user authentication is performed in accordance with a user ID and a password that are indicated in the reservation request information 71. The reservation request information 71 is transmitted from the terminal device 5 by the following procedure.

A customer, i.e., a driver who wants to use the parking lot A operates his or her terminal device 5 so as to start up the application program for reservation. Alternatively, the user may access a Web page that is provided by a Web application having a function similar to the application program for reservation by designating a URL of the reservation acceptance system 2. Of course, these operation and other operations that will be explained later may be performed by another person in the car for the driver. Then, the terminal device 5 will display a reservation screen HG1 having a parking lot reservation form as shown in FIG. 9.

The driver enters his or her user ID, password and a time for use in each text box TX. The "time for use" means a schedule time for using the parking lot, i.e., a desired time. After entering, the driver presses a transmission button BN1. Thus, the entered information is transmitted to the reservation acceptance system 2 as the reservation request information 71. If the driver wants to cancel the request for reservation, he or she presses a cancel button BN2. In the case where a telephone number of a cellular phone or a terminal ID is used as the user ID, it is possible to read out the information that is stored in the terminal and inform the reservation acceptance system 2 of the information without entering information in the text box TX that corresponds to the user ID. Thus, fraudulent usage of a user ID by an outsider can be prevented, so that a security can be improved.

In addition, the terminal device 5 transmits position information 72 that indicates a position of the terminal device 5 i.e., a current position of the customer to the reservation acceptance system 2 together with reservation request information 71. This position information 72 indicates a latitude and a longitude that are derived from radio waves that are transmitted from a GPS satellite or a base station on the earth. Alternatively, if the terminal device 5 is a cellular phone or a PHS cellular phone, a position of a base station (an antenna station) that captures the terminal device 5 can be regarded as the current car position. It can be an address like "Suehirocho 1-2-3". The position information 72 is received by the position information reception portion 202 in the reservation acceptance system 2 shown in FIG. 3.

The existence decision portion 203 decides whether the car of the customer is within a predetermined area in the vicinity of the parking lot A in accordance with the received position information 72. This predetermined area is an approximate area in which it is possible to arrive at the parking lot A in a predetermined time and is defined by the area condition information 81 shown in FIG. 5, for example. Namely, if the position indicated by the position information 72 belongs to any of the areas indicated by the conditions 1-3 of the area condition information 81, it is decided that the customer is close to the parking lot A. If the position indicated by the position information 72 does not belong to any area of the conditions, it is decided that the customer is not close to the parking lot A. The result of the decision is delivered to the reservation acceptance decision portion 204 as existence decision information 74.

The area of the area condition information 81 can be defined by vertexes of a polygon such as a tetragon or a heptagon as shown in the conditions 1 and 2 in FIG. 5. The area can be also defined by a function expressing a shape such as a circle or an ellipse. Alternatively, the area can be defined by a town name or a district name as shown in the condition 3. The area can have a complicated shape. The decision whether or not it satisfies the condition 1 or 2 is performed by calculating a representative point of the town (a center of the town, for example) if the position information 72 indicates a name of town or others, and by deciding whether or not the representative point belongs to the area indicated by the condition 1 or 2. In addition, the decision whether or not it satisfies the condition 3 is performed by deriving a name of the town to which the position belongs if the position information 72 indicates the position by a latitude and a longitude, and by comparing them.

It is possible to perform the decision whether or not the car of the customer is within the predetermined area in accordance with the distance condition information 82 shown in FIG. 6. Namely, if a distance between the position of the parking lot A and the position indicated by the position information 72 satisfies one of the conditions 1-3 indicated by the distance condition information 82, it is decided that the car of the customer is close to the parking lot A.

Alternatively, the decision can be performed in accordance with the time condition information 83 shown in FIG. 7. Namely, if the time necessary for moving from the position indicated by the position information 72 to the parking lot A satisfies one of the conditions 1-3 indicated by the time condition information 83, it is decided that the car of the customer is close to the parking lot A. Namely, it is decided whether or not the car of the customer is within the area of a distance corresponding to a predetermined necessary time. The necessary time can be derived in accordance with an average speed of a car and a distance between the position of the parking lot A and the position indicated by the position information 72, for example. It is possible to calculate the necessary time by referring traffic information or weather information provided from the information providing system 4 (see FIG. 1). The traffic information or other information is obtained by the traffic information obtaining portion 208.

The usage state obtaining portion 206 accesses the parking lot database 3D1 of the parking lot usage management system 3. Then, the usage state obtaining portion 206 obtains usage state information 73 that indicates a current usage state about a parking space that matches a car type of the car (see FIG. 4) of the customer who made the request for reservation among parking spaces in the parking lot A. The usage state information 73 indicates a total number of parking spaces, the number of vacant parking spaces or a current ratio of vacancy, for example.

The reservation acceptance decision portion 204 performs a decision whether or not the request for reservation from the customer is acceptable in accordance with the obtained usage state information 73 and the decision result by the existence decision portion 203, i.e., the existence decision information 74. This decision is performed as follows.

If the existence decision information 74 indicates that the customer is not close to the parking lot A, it is decided that the request for reservation from the customer is not acceptable. If the existence decision information 74 indicates that the customer is close to the parking lot A, the usage state of the parking lot A is further checked for deciding whether or not the request for reservation can be accepted.

For example, if the usage state information 73 indicates that there are a predetermined number (e.g., more than five) of vacant spaces in the parking space, it is decided that the request for reservation from the customer can be accepted. On the contrary, if the vacant spaces are less than the predetermined number, it is decided that the request for reservation from the customer cannot be accepted. Furthermore, it is possible to set the predetermined number to zero if it is predicted that the number of outgoing cars will be larger than the number of parking spaces of the future demand after predicting the future demand and the number of outgoing cars in accordance with the past usage result of the parking lot A or traffic information or weather information that are provided by VICS or others. Namely, it can be decided that the request for reservation is acceptable if the usage of the parking lot has a decreasing tendency even if the parking lot A is full at present.

In addition, it is possible to determine the predetermined number like "10 percent of the total parking spaces in the parking lot A". Furthermore, "the total parking spaces" is not necessarily the entire of the really existing parking spaces. For example, a part of the really existing parking spaces can be considered as the total parking spaces like "80% of the really existing parking space", and the remained parking spaces can be used for spare parking spaces or used for a customer who comes without a reservation. Alternatively, in expectation of cancels, it is possible to regard parking spaces more than real (e.g., 105% of the really existing parking space) as the total parking spaces.

The reservation acceptance processing portion 205 asks the parking lot usage management system 3 to register the reservation when it is decided that the request for reservation from the customer is acceptable. On this occasion, a user ID of the customer, a schedule time of the use (the time for use) and a license number of the car are informed in accordance with the items entered in the reservation screen HG1 (see FIG. 9) and the customer table TL1 (see FIG. 4).

The reservation information database 3D2 stores and manages the reservation table TL3 shown in FIG. 10. The reservation table TL3 stores reservation information 75 about reservations. The reservation information database 3D2 adds a new record (reservation information 75) to the reservation table TL3 in accordance with the request from the reservation acceptance system 2. Thus, the acceptance of the reservation that was requested by the customer is finished.

An "expiration time" indicated by the reservation information 75 is a time limit of a reservation. If the customer does not arrive at the parking lot A by this expiration time, the reservation is canceled. The expiration time is determined in accordance with a length of the time for use, for example. For example, if time for use is one hour, the expiration time may be thirty minutes later from the present time. The expiration time may be delayed by ten minutes step when the time for use increases by two hours step. Thus, a customer who uses longer hours, i.e., a customer who contributes more to sales is accepted with higher priority, so that the entire sales of the parking lot can be improved efficiently.

Alternatively, a time necessary for the customer to arrive at the parking lot A (a necessary time until arrival) is calculated in accordance with the current position of the customer indicated by the position information 72. Then, the expiration time of the reservation may be calculated by adding a spare time to the present time considering the necessary time until arrival and a time loss due to a traffic jam or an error. For example, it is supposed that the present time is 9:10, the necessary time until arrival is calculated to be 20 minutes, and the time loss or the error (the spare time) is calculated to be 10 minutes. Then, the expiration time of the reservation is determined to be 9:40. Namely, the expiration time in this case indicates the forecasted time when the customer will arrive taking account of some spare time.

After finishing the reservation, a message is transmitted to the terminal device 5 together with a reservation acceptance ID. The message says that the reservation has been accepted and registered in the database. If the reservation acceptance decision portion 204 decided that the request for reservation was not acceptable, i.e. was refused, a message indicating the refusal is transmitted.

The cancel processing portion 207 performs the canceling process of a reservation that has been accepted and registered once. Namely, when the terminal device 5 of the customer makes a request to cancel the reservation, the reservation acceptance ID designated by the customer is transmitted to the reservation information database 3D2. Then, the reservation information database 3D2 deletes a record (the reservation information 75) that corresponds to the reservation acceptance ID from the reservation table TL3 shown in FIG. 10, so as to cancel the registration of the reservation. Then, the cancel processing portion 207 transmits a message that says that the cancel of the reservation is completed to the terminal device 5.

In addition, it is possible to check the expiration time of each reservation information 75 in the reservation table TL3 in a regular interval, so as to expire the reservation of the customer regardless of the request if a customer who has not arrived at the parking lot A even after the expiration time. The expiration time is checked mainly by the cancel processing portion 207 that makes an inquiry to the reservation information database 3D2 in a regular interval. Otherwise, the expiration time is checked mainly by the reservation information database 3D2, and the cancel processing portion 207 is informed of a reservation that has passed the expiration time when it is found.

The canceling process may be performed even before the expiration time if it is forecasted that the car of the customer cannot arrive at the parking lot A by the expiration time of the reservation. This forecast may be performed in the following procedure by the arrival time forecast portion 271 and the arrival possibility decision portion 272, for example.

After finishing the reservation, the terminal device 5 transmits the position information 72 thereof to the reservation acceptance system 2 at an interval of a predetermined time (e.g., five minutes). Thus, the reservation acceptance system 2 can grasp a current position of the customer at a regular interval. The arrival time forecast portion 271 calculates a forecasted time when the customer will arrive at the parking lot A at this point in accordance with a position that is indicated by the received position information 72, traffic information provided by the information providing system 4, and the present time. The arrival possibility decision portion 272 decides (forecasts) that the car of the customer will not arrive by the expiration time if the calculated time exceeds the expiration time that is indicated by the reservation information 75. Furthermore, these processes are performed continuously during the period until the customer arrives at the parking lot A or until the reservation is canceled.

Figure 11:
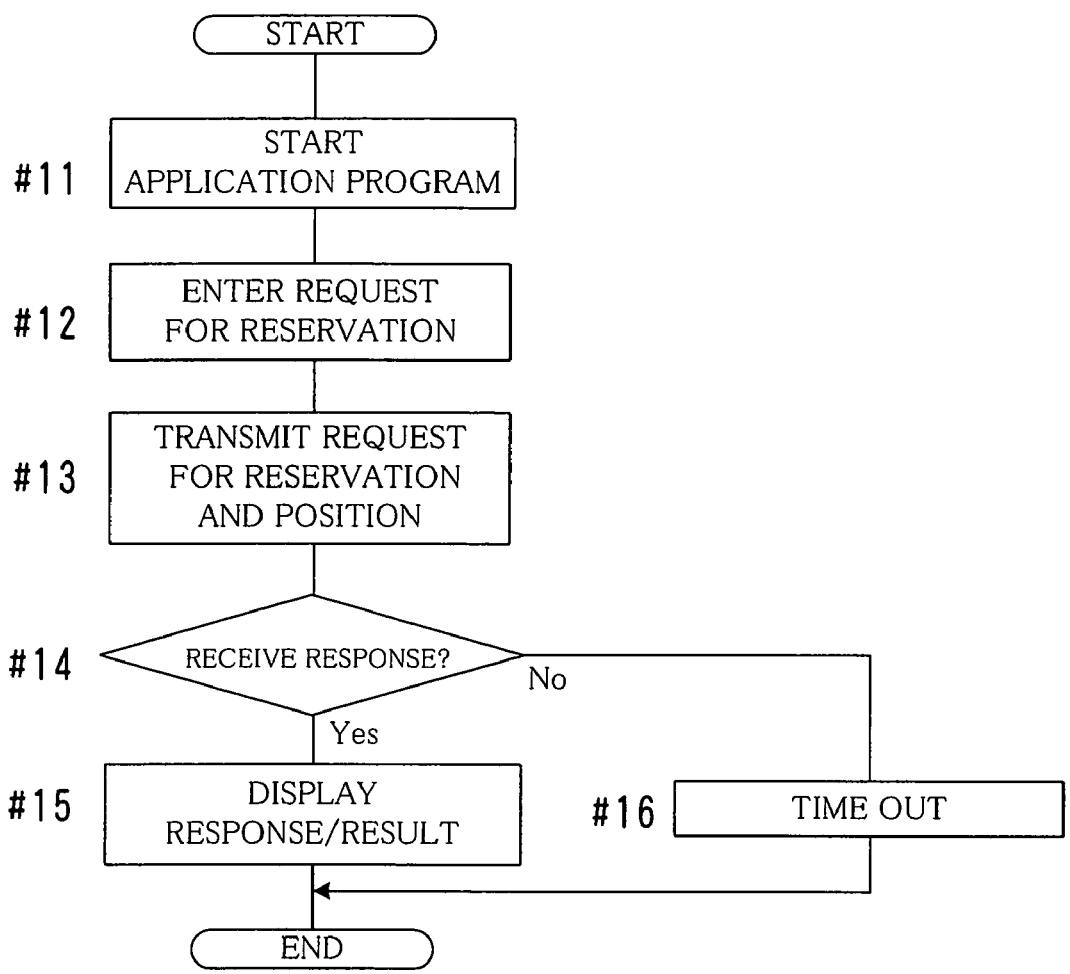
FIG. 11 is a flowchart explaining an example of a flow of a process in a terminal device when a request for reservation is performed.
Figure 12:
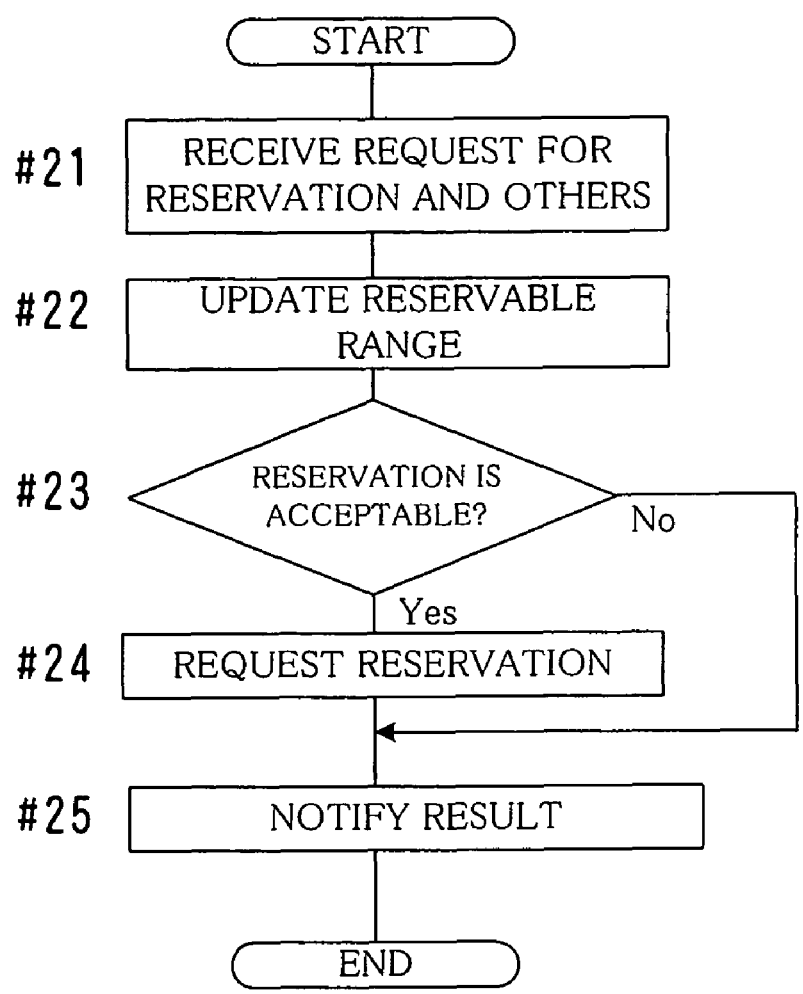
FIG. 12 is a flowchart explaining an example of a flow of a process in the reservation acceptance system when an acceptance of a request for reservation is performed.
Figure 14:
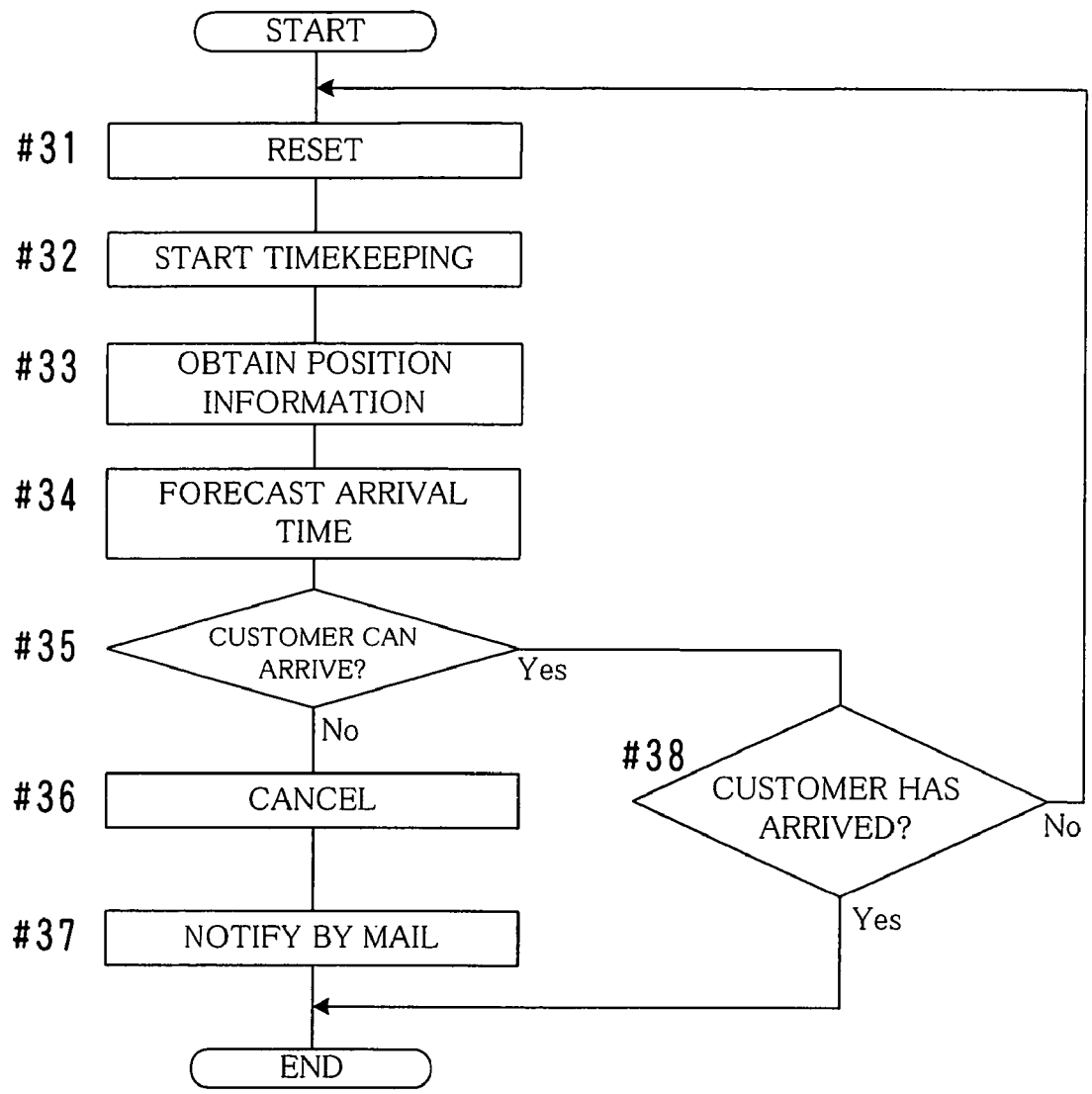
FIG. 14 is a flowchart explaining an example of a flow of a process in the reservation acceptance system when a canceling process is performed.

FIG. 11 is a flowchart explaining an example of a flow of a process in a terminal device 5 when a request for reservation is performed. FIG. 12 is a flowchart explaining an example of a flow of a process in the reservation acceptance system 2 when an acceptance of a request for reservation is performed. FIGS. 13A-13D are tables showing an example of change information tables TL8a-TL8d. FIG. 14 is a flowchart explaining an example of a flow of a process in the reservation acceptance system 2 when a canceling process is performed.

Next, flows of processes in the devices when the reservation of the parking lot A is performed with reference to the flowcharts.

In FIG. 11, a driver who wants to make a reservation of the parking lot A stops driving the car and operates the terminal device 5 so as to start the application program for reservation (#11). Alternatively, the driver enters a predetermined URL so as to access the Web page of the reservation acceptance system 2. Thus, the reservation screen HG1 is displayed on the terminal device 5 as shown in FIG. 9. The driver enters his or her user ID, password and desired time for use, and presses the transmission button BN1 (#12). Then, the reservation request information 71 that indicates the entered information and the position information 72 that indicates a current position of the customer are transmitted to the reservation acceptance system 2 (#13).

On the other hand, the reservation acceptance system 2 receives the reservation request information 71 and the position information 72 as shown in FIG. 12 (#21) and decides whether or not the reservation can be accepted in accordance with the information and the condition information 8 (see FIGS. 5, 6 and 7) (#23). Furthermore, before the decision, the condition information 8 that is used for the decision can be changed as follows if necessary (#22).

For example, a change information table TL8a as shown in FIG. 13A is prepared. This change information table TL8a defines a condition (area) for deciding whether or not the reservation is acceptable corresponding to the ratio of vacancy in the total parking spaces of the parking lot A. The information table TL8a is used for changing a content of the "condition number =1" in the distance condition information 82 as shown in FIG. 6. The tables shown in FIGS. 13B-13D that will be explained later are also used for changing a content of the "condition number=1" in the distance condition information 82.

From the change information table TL8a, a condition of a level corresponding to the ratio of vacancy indicated by the usage state information 73 obtained by the usage state obtaining portion 206 shown in FIG. 3 is selected. For example, if "the ratio of vacancy is equal to 3%", a condition of level 1, i.e., "the distance is less than 3 km" is selected. Then, the selected condition is replaced with a condition of the condition number 1 in the distance condition information 82 shown in FIG. 6, i.e., "the distance is less than 10 km". Thus, the condition information 8 that is used for the decision is changed.

In this way, if there are a lot of vacant spaces, the range (area) for accepting customers is enhanced, so as to accept more customers for increasing a profit. Furthermore, if there are little vacant spaces, the range for accepting customers is decreased, so as to restrict to customers who can arrive soon. Thus, a turnover and an availability factor of a parking space are improved so that a profit can be improved effectively. Instead of the ratio of vacancy, it is possible to change the condition information 8 that is used for decision in accordance with the number of vacant parking spaces.

Alternatively, it is possible to change the condition information 8 that is used for decision in accordance with a schedule time of the use of the parking lot A, i.e., the length of the time for use designated in the reservation screen HG1 shown in FIG. 9. In this case, the change is performed in accordance with the change information table TL8b as shown in FIG. 13B. Namely, the condition for accepting the reservation is defined more loosely as the length of the schedule time of the use is longer, while the condition is defined more strictly as the length is shorter.

In this way, the condition is loosened for a customer who uses the parking lot A for longer hours, i.e., a customer who contributes more to sales so that the reservation can be accepted easily. Thus, a profit can be improved effectively.

Alternatively, it is possible to change the condition information 8 that is used for decision in accordance with a forecasted number of customers who will arrive at the parking lot A in the future (e.g., about one hour later from the present time). In this case, the change is performed in accordance with a change information table TL8c as shown in FIG. 13C. Namely, the condition is defined more strictly as more demand is forecasted, while the condition is defined more loosely as less demand is forecasted. The demand can be determined in accordance with the past usage result of the parking lot A, or traffic information or weather information provided by VICS or others, by using a predetermined function.

Alternatively, it is possible to change the condition information 8 that is used for decision in accordance with a day of the week or a time zone of the day. In this case, the change is performed in accordance with a change information table TL8d as shown in FIG. 13D. Namely, the condition is defined more loosely for days of the week or time zones of the day of less demand forecasted, while the condition is defined more strictly for days of the week or time zones of the day of more demand forecasted.

In this way, the condition is loosened as the forecasted demand is less, so that the ratio of vacancy can be decreased and a profit can be improved. In addition, the condition is defined more strictly as the forecasted demand is more, so that customers who are close to the parking lot A are accepted with higher priority. Thus, a turnover and an availability factor can be enhanced, and a profit can be improved effectively.

In the same way, tables are prepared corresponding to FIGS. 13A-13D for changing the conditions of the condition numbers 2 and 3 shown in FIG. 6, and the replacement (change) of the conditions is performed. Instead of these tables, it is possible to prepare a function having a parameter that is the ratio of vacancy. In addition, concerning the area condition information 81 shown in FIG. 5 and the time condition information 83 shown in FIG. 7 too, it is possible to prepare tables or functions corresponding to FIGS. 13A-13D for conditions of the condition numbers 1-3. The ratio of vacancy, i.e., the parameter shown in FIG. 13A may be expressed by words that mean states such as "(parking spaces are) very many" or "a little many", "little". Similarly, the time for use shown in FIG. 13B may be expressed by a word like "short", "normal" or "long". The demand forecast shown in FIG. 13C may be expressed by a word like "many", "normal" or "little".

Furthermore, the change of the condition information 8 that is used for decision may be performed at a regular interval of a predetermined time. Alternatively, if information such as the traffic information or the weather information is transmitted to the reservation acceptance system 2 every time when the information is updated by a so-called presence system, it is possible to decide every time whether or not it is necessary to change the condition information 8, and to perform the change if necessary.

Referring to FIG. 12 again, if it is decided that the reservation can be accepted (Yes in #23), registration of the reservation is requested to the parking lot usage management system 3 (#24). On this occasion, the expiration time of the reservation is calculated by forecasting the arrival time of the customer, and the parking lot usage management system 3 is informed of the expiration time. Thus, new reservation information 75 is added to the reservation table TL3 (see FIG. 10), and acceptance of the reservation is finished. Then, the terminal device 5 that made the request for reservation is informed that the reservation is accepted (#25). If it is decided that the reservation is not acceptable (No in #23), the terminal device 5 that made the request is informed of the nonacceptance (#25).

Referring to FIG. 11 again, if the terminal device 5 is informed of the acceptance or nonacceptance of the reservation in a predetermined time after the request for reservation was made (Yes in #14), contents of the information is displayed (#15). If there is no information even after the predetermined time has passed (No in #14), it is regarded that the request for reservation was not accepted, and a time out message is displayed (#16).

After the reservation is accepted, the reservation acceptance system 2 performs a process for canceling the reservation as shown in FIG. 14. A timer is reset (#31), and timekeeping is started (#32). After a predetermined time passed, position information 72 that indicates a current position of the customer related to the reservation is obtained (#33).

A time when the customer will arrive at the parking lot A is calculated (forecasted) at present time in accordance with the position indicated by the position information 72 and the present time (#34). The forecasted time of arrival at present time is compared with the expiration time (see FIG. 10) indicated by the reservation information 75, so as to decide whether or not the customer can arrive in the expiration time of the reservation (#35).

If it is decided that the customer cannot arrive in the expiration time (No in #35), the parking lot usage management system 3 is asked to cancel the reservation (#36). Thus, the reservation information 75 related to the reservation is deleted from the reservation table TL3. Then, the cancellation is transmitted to the terminal device 5 that made the request for reservation (#37). If it is decided that the customer can arrive in the expiration time (Yes in #35), the process of steps #31-#35 is repeated until the car arrives the parking lot A (No in #38). Furthermore, if the customer requested the cancellation or if the expiration time has passed, the request to cancel in step #36 is performed regardless of the result of the decision.

According to this embodiment, customers are selected for accepting the reservation, so that the manager of the parking lot can make parking spaces being used efficiently by customers. In addition, by making contents of the condition information 8 dynamic, a turnover and an availability factor of the parking space can be improved.

Second Embodiment

Figure 15:
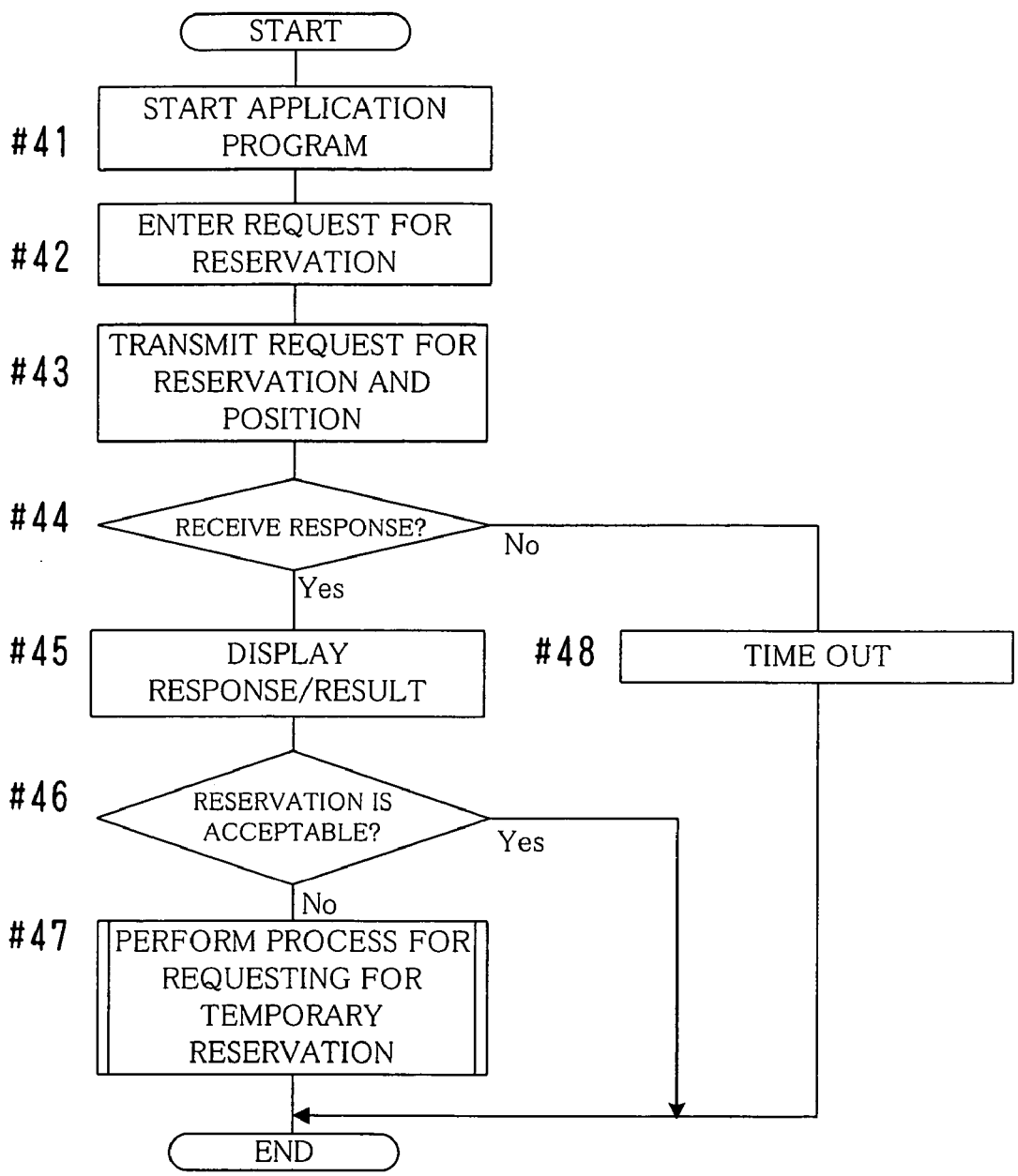
FIG. 15 is a flowchart explaining an example of a flow of a process in the terminal device when a request for temporary reservation is performed.
Figure 16:
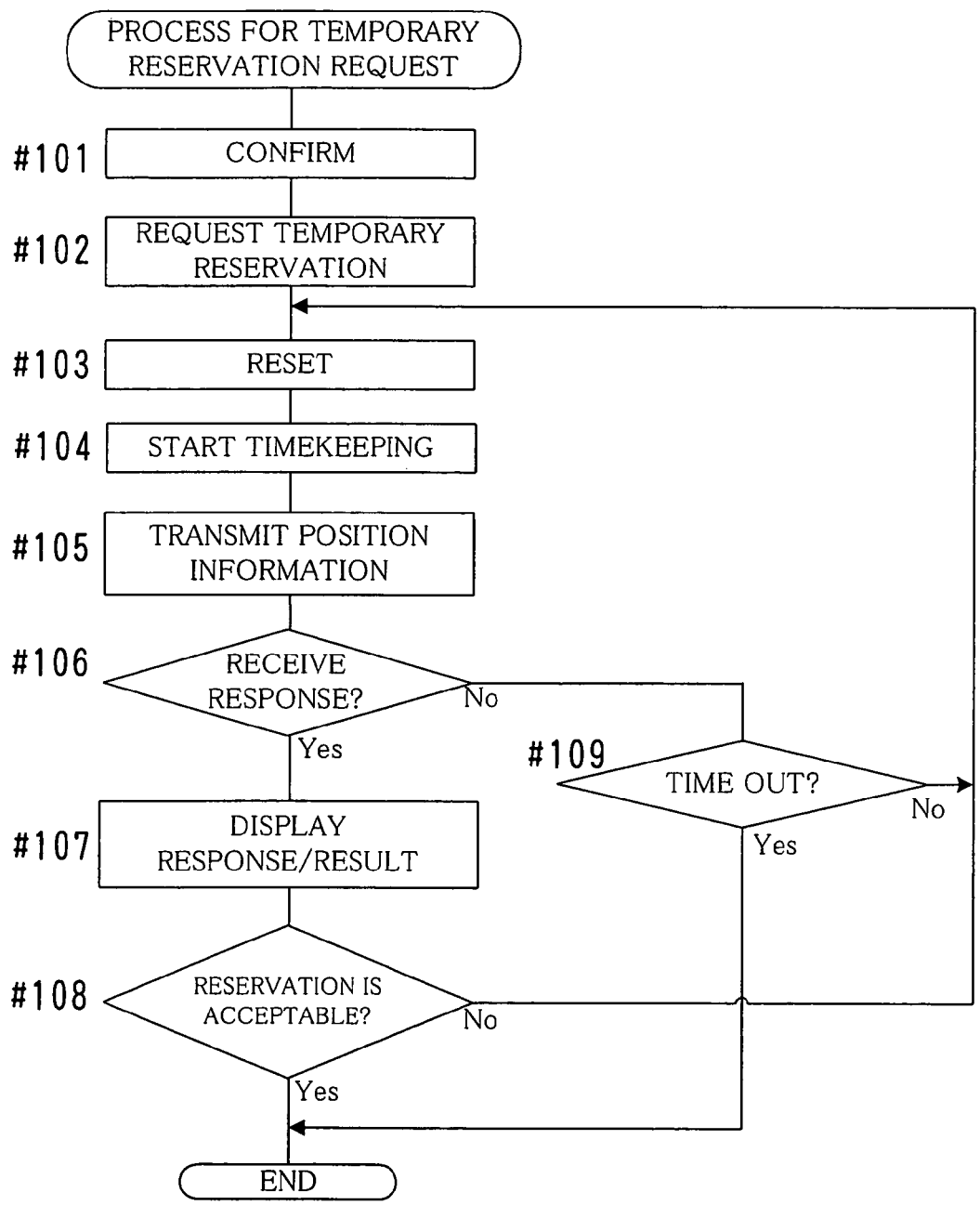
FIG. 16 is a flowchart explaining an example of a flow of a process when a temporary reservation is performed.
Figure 17:
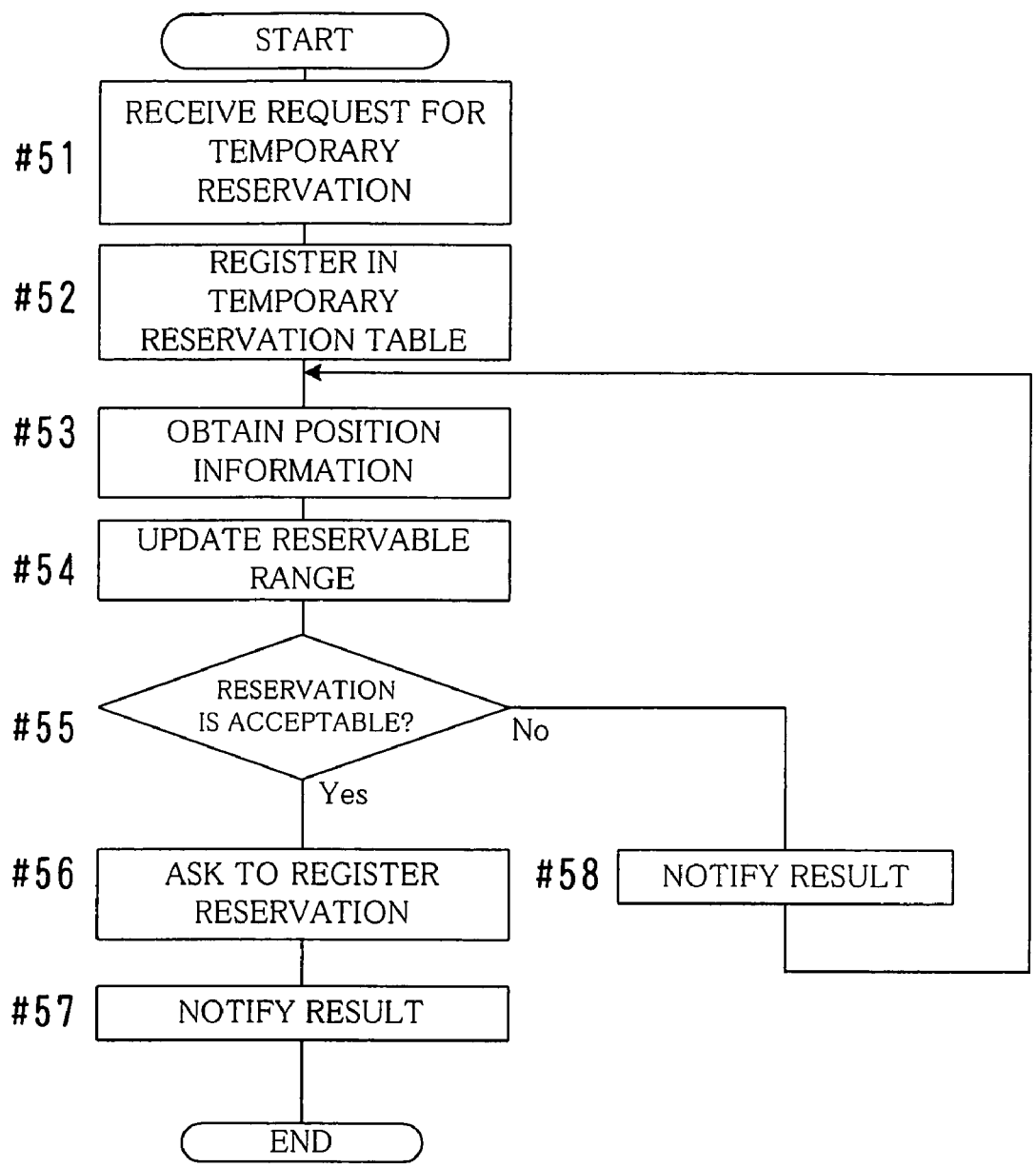
FIG. 17 is a flowchart explaining an example of a flow of a process in the reservation acceptance system when an acceptance of a request for temporary reservation is performed.
Figure 18:
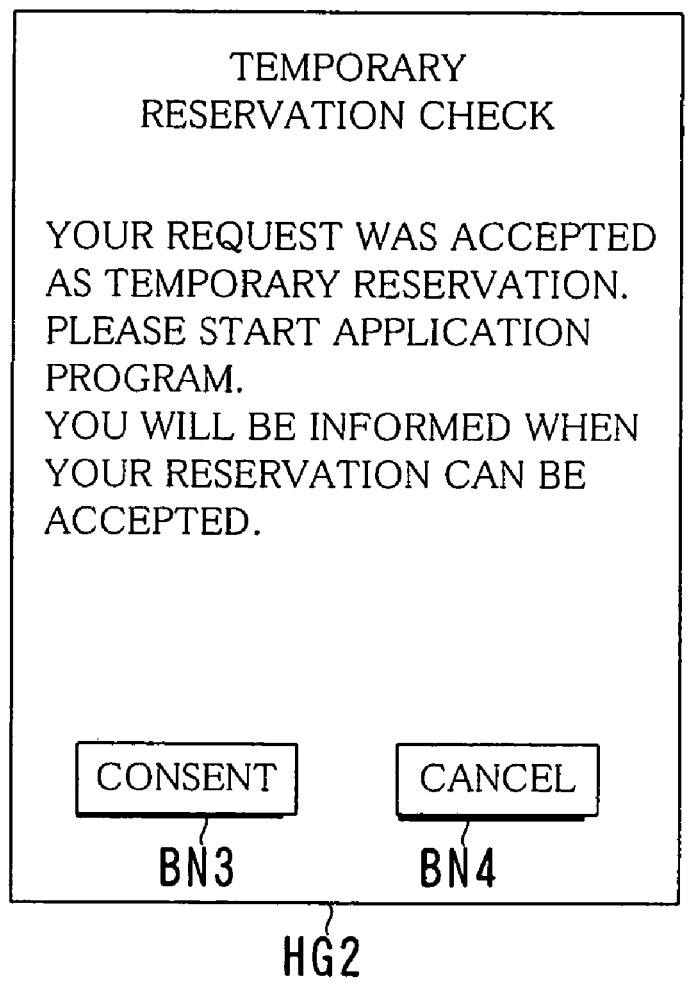
FIG. 18 is a diagram showing an example of a temporary reservation check screen.
Figure 19:
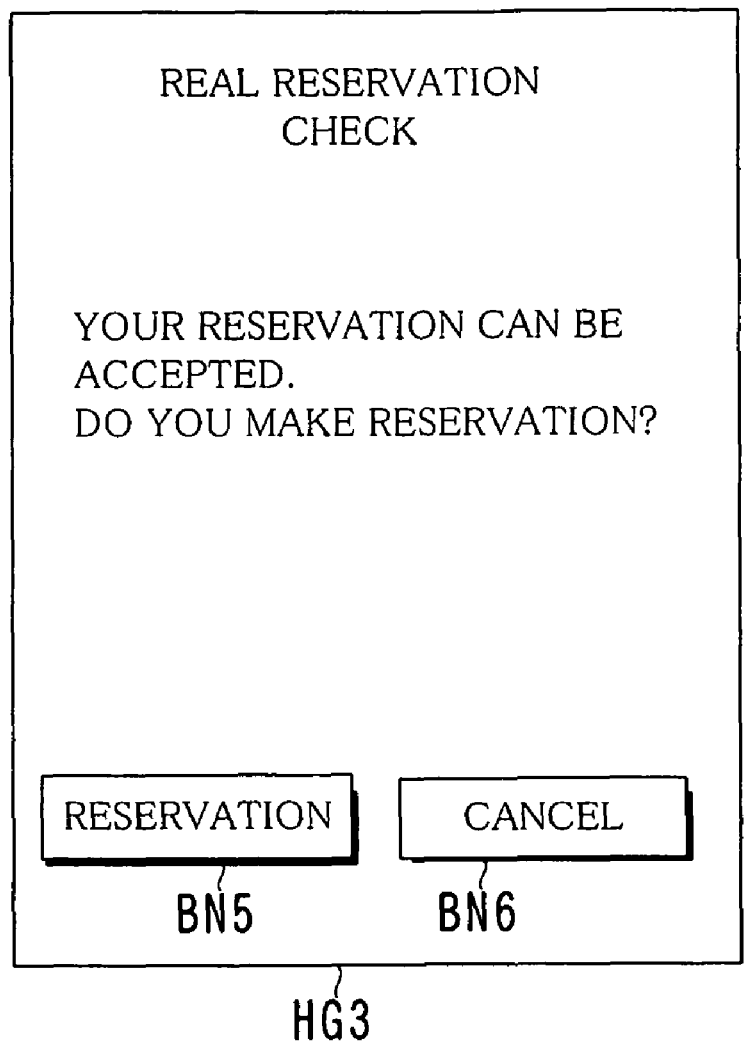
FIG. 19 is a diagram showing an example of a real reservation check screen.

FIG. 15 is a flowchart explaining an example of a flow of a process in the terminal device 5 when a request for temporary reservation is performed. FIG. 16 is a flowchart explaining an example of a flow of a process when a temporary reservation is performed. FIG. 17 is a flowchart explaining an example of a flow of a process in the reservation acceptance system 2 when an acceptance of a request for temporary reservation is performed. FIG. 18 is a diagram showing an example of a temporary reservation check screen HG2. FIG. 19 is a diagram showing an example of a real reservation check screen HG3.

In the first embodiment, the reservation acceptance processing portion 205 shown in FIG. 3 performs the process for accepting the reservation only when it is decided by the reservation acceptance decision portion 204 that the request for reservation is acceptable. In the second embodiment, the reservation acceptance processing portion 205 accepts the request temporarily even if it is decided that the request for reservation is not accepted. Then, when it becomes to satisfy the condition for accepting the reservation after that, the reservation is accepted formally, and the process for registering in the reservation table TL3 is performed. Hereinafter, a temporary acceptance of the reservation may be referred to as a "temporary reservation", while a formal acceptance of the reservation may be referred to as a "real reservation".

The structures of the reservation system 1, the reservation acceptance system 2, the parking lot usage management system 3 and the terminal device 5 in the second embodiment are the same as in the first embodiment. However, the reservation acceptance system 2 and the terminal device 5 perform the processes as shown in FIGS. 15, 16 and 17.

In FIG. 15, the terminal device 5 displays the reservation screen HG1 shown in FIG. 9 so as to receive inputs of necessary items, and the reservation request information 71 and the position information 72 are transmitted to the reservation acceptance system 2 so that the request for reservation is made (#41-#43). The contents of these processes are the same as the case in steps #11-#13 shown in FIG. 11.

If there is information about acceptance or nonacceptance of the reservation in a predetermined time after making the request for reservation (Yes in #44), contents of the information are displayed (#45). If the contents of the information indicate that the reservation is not acceptable (No in #46), a process for requesting for a temporary reservation is performed (#47). This process is performed by the procedure as shown in FIG. 16.

The terminal device 5 displays the temporary reservation check screen HG2 as shown in FIG. 18, so as to make the customer (the driver) confirm making the temporary reservation (#101 in FIG. 16). If a consent button BN3 is pressed, it is decided that the confirmation of making the reservation is done, and the request for temporary reservation is made toward the reservation acceptance system 2 (#102).

A timer is reset (#103), and timekeeping is started (#104). After a predetermined time passed, position information 72 of the customer at that time is transmitted to the reservation acceptance system 2 (#105). After the transmission, the display screen goes back to an initial screen of the application program for reservation, so as to wait information from the reservation acceptance system 2.

On the other hand, the reservation acceptance system 2 receives the request for temporary reservation from the terminal device 5 as shown in FIG. 17 (#51), registers the record that indicates the request in a temporary reservation table (not shown) (#52), and informs the terminal device 5 of acceptance of the temporary reservation. At this time point, the reservation is not accepted formally, so the parking space is not secured. After the information, the reservation acceptance system 2 receives position information 72 from the terminal device 5 (#53), updates the condition information 8 (see FIGS. 5, 6, 7 and 13A-13D) if necessary (#54), and then decides whether or not the reservation can be accepted (#55). Namely, it is decided whether or not the latest position of the customer is within a predetermined area and there is a vacant parking space that matches the car type of the customer' car.

If it is decided that the reservation can be accepted (Yes in #55), a message saying that the real reservation becomes possible is transmitted to the terminal device 5 (#57). Then, the terminal device 5 displays the real reservation check screen HG3 as shown in FIG. 19 (Yes in #106 in FIG. 16 and #107).

The customer presses the reservation button BN5 if he or she wants the real reservation. Then, the reservation acceptance system 2 asks the parking lot usage management system 3 to register the reservation (#56 in FIG. 17). In this way, the parking lot usage management system 3 registers the record of the reservation (the reservation information 75) in the reservation table TL3 shown in FIG. 10. After the registration, the record that corresponds to the reservation and is registered in the temporary reservation table is deleted. Furthermore, if the cancel button BN6 is pressed, it is regarded that the request for reservation is canceled, so the real reservation is not registered.

If it is decided that the reservation cannot be accepted (No in #55), the terminal device 5 is informed of the nonacceptance (#58). On this occasion, the terminal device 5 displays the message saying that the real reservation is not accepted yet if necessary (#107 in FIG. 16), and restarts the process from step #103 (No in #108). The reservation acceptance system 2 waits new position information 72 that is transmitted from the terminal device 5 at an interval of a predetermined time and repeats the process of steps #53-#55 shown in FIG. 17. Namely, until it is decided that it can be accepted, the position information 72 is obtained at a regular interval, so that the decision is repeated for deciding whether or not the real reservation can be accepted.

Furthermore, if there is no response from the reservation acceptance system 2 even after the predetermined time has passed, the terminal device 5 regards that it is time-out (No in #106 in FIG. 16 and Yes in #107) and stops the request for reservation.

According to this embodiment, a customer who has a strong want to use the parking lot can be kept by the temporary reservation, so that customers can be kept more efficiently than the case of the first embodiment.

Although the parking lot database 3D1 and the reservation information database 3D2 are provided in the parking lot usage management system 3 in the first and the second embodiments, they can be provided in the reservation acceptance system 2. Alternatively, it is possible to provide a part of functions of the reservation acceptance system 2 in the parking lot usage management system 3.

It is possible to delay the execution of the canceling process in accordance with a length of the time for use. For example, a standard time for use may be set to one hour, and the canceling process may be performed with delay of ten minutes step as the time for use increases by two hours step.

Although the example of the reservation system 1 in the case where acceptance of a reservation of a parking lot is performed in the first and the second embodiments, it is possible to apply this reservation system 1 to various reservation acceptance processes such as a reservation of a room in a Karaoke shop, a reservation of a limited number of products, a reservation of an OA machine such as a personal computer or a copying machine installed in a rental office, a reservation in a beauty shop.

It is possible to use the reservation acceptance system 2 for accepting reservations of plural parking lots. In this case, the parking lot usage management system 3 is provided for each of the plural parking lots. The reservation acceptance system 2 may be provided with the condition information 8 (see FIGS. 5, 6, 7 and 13A-13D) for each parking lot, so as to determine the condition for deciding whether or not the reservation can be accepted. The customer designates a desired parking lot to the reservation acceptance system 2 when making the request for reservation. Then, the reservation acceptance system 2 performs the reservation acceptance process in accordance with the condition information 8 of the designated parking lot.

Although the customer (the user) designates his or her user ID and other information for making a request for reservation on the reservation screen HG1 as shown in FIG. 9, it is possible that a customer who is not registered as a user designates a car number of his or her car and an electronic mail address of the terminal device 5 instead of the user ID for making a request for reservation.

The structures of the entire or a part of the reservation system 1, the reservation acceptance system 2, the parking lot usage management system 3, the terminal device 5, the contents of the database, the structure of the screens, the contents of the processes, the order of the processes, the condition that is used for the decision and others can be modified if necessary in the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A reservation acceptance system running on a processor, comprising:
    an area information storage portion that stores, therein, area information that defines a plurality of areas having different sizes around a provision position of a service, each of the plurality of areas corresponding to an amount of demand of the service and having a larger size as the amount of demand of the service is smaller;
    a request acceptance portion that receives request information indicating a request for providing a the service, the request information being sent by a customer;
    a current position information obtaining portion that obtains current position information indicating a current position of the customer who sent the request information;
    a traffic information obtaining portion that obtains traffic information delivered by an information provider, the traffic information being traffic information around the provision position of the service or traffic information around the customer who sent the request information;
    a demand amount forecast portion that forecasts, by using a predetermined function, an amount of future demand of the service based on the traffic information obtained by the traffic information obtaining portion;
    an existence decision portion that determines, using the processor whether or not the current position of the customer indicated in the current position information is included in an acceptance area, the acceptance area being one of the plurality of areas and corresponding to the amount of future demand of the service thus forecasted; and
    a reservation acceptance processing portion that accepts a reservation of the service for the customer who sent the request information if the existence decision portion determines that the current position of the customer is included in the acceptance area, and does not accept the reservation of the service for the customer unless the current position of the customer is included in the acceptance area.

2. A reservation acceptance system running on a processor for accepting a reservation of a parking lot, comprising:
- an area information storage portion that stores, therein, area information that defines a plurality of areas having different sizes around the parking lot, each of the plurality of areas corresponding to an amount of demand of the parking lot and having a larger size as the amount of demand is smaller;
- a request acceptance portion that receives a request information indicating a request for parking a car in the parking lot;
- a current position information obtaining portion that obtains current position information indicating a current position of a customer who made the request;
- a traffic information obtaining portion that obtains traffic information delivered by an information provider, the traffic information being traffic information around the parking lot or the customer who made the request;
- a demand forecast unit that forecasts, by using a predetermined function, an amount of future demand of the parking lot based on the traffic information obtained by the traffic information obtaining portion;
- an existence decision portion that determines using the processer whether or not the current position of the customer indicated in the current position information is included in an acceptance area, the acceptance area being one of the plurality of areas and corresponding to the amount of future demand of the parking lot thus forecasted;
- a reservation acceptance processing portion that accepts a reservation of the parking lot for the customer who made the request if the existence decision portion determines that the current position of the customer is included in the acceptance area and does not perform the reservation unless the existence decision portion determines that the current position of the customer is included in the acceptance area.

3. The reservation acceptance system according to claim 1, wherein, when a second request for a temporary reservation is received from the customer who made the request after the existence decision portion determines that the current position of the customer is not included in the acceptance area,
- the current position information obtaining portion newly obtains the current position information of the customer,
- the existence decision portion newly determines whether or not the current position of the customer indicated in the new current position information is included in the acceptance area, and
- the reservation acceptance processing portion accepts the reservation if the existence decision portion determines that the current position of the customer indicated in the new current position information is included in the acceptance area.

4. The reservation acceptance system according to claim 1,
- an arrival time forecast portion that forecasts time of arrival of the customer who made the request at the provision position;
- an arrival possibility decision portion that determines whether the customer who made the request will arrive by the forecasted time of arrival in accordance with the forecasted time of arrival, present time and current position information of the customer that was obtained after the reservation had been accepted; and
- a cancel processing portion that cancels the reservation corresponding to the request when the arrival possibility decision portion that determines that the customer who made the request will not arrive by the forecasted time.

5. A reservation acceptance system running on a processor for accepting a reservation of a parking lot, comprising:
- an area information storage portion that stores, therein, area information that defines a plurality of areas having different sizes around the parking lot, each of the plurality of areas corresponding to time and having a larger size as the time is shorter;
- a request acceptance portion that receives request information indicating a request for parking a car in the parking lot and desired parking time;
- a current position information obtaining portion that obtains current position information indicating a current position of a customer who made the request;
- an existence decision portion that determines using the processor whether or not the current position of the customer indicated in the current position information of the customer is included in an acceptance area, the acceptance area being one of the plurality of areas and corresponding to the desired parking time; and
- a reservation acceptance processing portion that accepts a reservation of the parking lot for the customer who made the request if the existence decision portion determines that the current position of the customer is included in the acceptance area and does not perform the reservation unless the existence decision portion determines that the current position of the customer is included in the acceptance area.

6. The reservation acceptance system according to claim 2, wherein, when a second request for a temporary reservation is received from the customer who made the request after the existence decision portion determines that the current position of the customer is not included in the acceptance area,
- the current position information obtaining portion newly obtains the current position information of the customer,
- the existence decision portion newly determines whether or not the current position of the customer indicated in the new current position information is included in the acceptance area, and
- the reservation acceptance processing portion accepts the reservation if the existence decision portion determines that the current position of the customer indicated in the new current position information is included in the acceptance area.

7. The reservation acceptance system according to claim 2,
- an arrival time forecast portion that forecasts time of arrival of the customer who made the request at the parking lot;
- an arrival possibility decision portion that determines whether the customer who made the request will arrive by the forecasted time of arrival in accordance with the forecasted time of arrival, present time and current position information of the customer that was obtained after the reservation had been accepted; and
- a cancel processing portion that cancels the reservation corresponding to the request when the arrival possibility decision portion that determines that the customer who made the request will not arrive by the forecasted time.

8. A non-transitory computer-readable storage medium storing thereon a computer program used in a computer accessible to an area information storage portion that stores, therein, area information that defines a plurality of areas having different sizes around a provision position of a service, each of the plurality of areas corresponding to an amount of demand of the service and having a larger size as the amount of demand of the service is smaller, the computer program causing the computer to perform:

a request acceptance step of receiving request information indicating a request for providing the service, the request information being sent by a customer;

a current position information obtaining step of obtaining current position information indicating a current position of the customer who sent the request information;

a traffic information obtaining step of obtaining traffic information delivered by an information provider, the traffic information being traffic information around the provision position of the service or traffic information around the customer who sent the request information;

a demand amount forecast step of forecasting, by using a predetermined function, an amount of future demand of the service based on the obtained traffic information;

an existence decision step of determining whether or not the current position of the customer indicated in the current position information is included in an acceptance area, the acceptance area being one of the plurality of areas and corresponding to the amount of future demand of the service thus forecasted; and a reservation acceptance processing step of accepting a reservation of the service for the customer who sent the request information if it is determined in the existence decision step that the current position of the customer is included in the acceptance area, and not accepting the reservation of the service for the customer unless it is determined in the existence decision step that the current position of the customer is included in the acceptance area.

* * * * *

UNITED STATES PATENT AND TRADEMARK OFFICE
CERTIFICATE OF CORRECTION

| | | |
|---|---|---|
| PATENT NO. | : 8,082,164 B2 | Page 1 of 1 |
| APPLICATION NO. | : 10/763181 | |
| DATED | : December 20, 2011 | |
| INVENTOR(S) | : Kakuta et al. | |

It is certified that error appears in the above-identified patent and that said Letters Patent is hereby corrected as shown below:

Column 14, Line 44, In Claim 1, delete "a the" and insert -- the --, therefor.

Column 14, Line 60, In Claim 1, delete "processor" and insert -- processor, --, therefor.

Column 15, Line 29-30, In Claim 2, delete "determines using the processor" and insert -- determines, using the processor, --, therefor.

Column 16, Line 30-31, In Claim 5, delete "determines using the processor" and insert -- determines, using the processor, --, therefor.

Signed and Sealed this
Twenty-ninth Day of May, 2012

David J. Kappos
*Director of the United States Patent and Trademark Office*